United States Patent
Nyström et al.

(10) Patent No.: US 9,071,439 B2
(45) Date of Patent: Jun. 30, 2015

(54) METHOD AND APPARATUS FOR REMOTE ADMINISTRATION OF CRYPTOGRAPHIC DEVICES

(75) Inventors: Magnus Nyström, Vallentuna (SE); William M. Duane, Westford, MA (US); James Townsend, Brookline, NH (US)

(73) Assignee: EMC Corporation, Hopkinton, MA (US)

( * ) Notice: Subject to any disclaimer, the term of this patent is extended or adjusted under 35 U.S.C. 154(b) by 2395 days.

(21) Appl. No.: 11/769,855

(22) Filed: Jun. 28, 2007

(65) Prior Publication Data

US 2008/0270791 A1 Oct. 30, 2008

Related U.S. Application Data

(60) Provisional application No. 60/914,199, filed on Apr. 26, 2007.

(51) Int. Cl.
*H04L 29/00* (2006.01)
*H04L 9/32* (2006.01)
*H04L 9/08* (2006.01)
*H04L 29/06* (2006.01)

(52) U.S. Cl.
CPC .......... *H04L 9/3228* (2013.01); *H04L 9/0863* (2013.01); *H04L 9/0891* (2013.01); *H04L 9/3213* (2013.01); *H04L 63/0807* (2013.01); *H04L 2209/80* (2013.01)

(58) Field of Classification Search
USPC ........................................ 380/273; 713/165
See application file for complete search history.

(56) References Cited

U.S. PATENT DOCUMENTS

| 4,720,860 A | 1/1988 | Weiss | |
|---|---|---|---|
| 5,168,520 A | 12/1992 | Weiss | |
| 5,361,062 A | 11/1994 | Weiss et al. | |
| 7,548,620 B2 * | 6/2009 | Popp | 380/273 |
| 7,865,738 B2 * | 1/2011 | Buck et al. | 713/184 |
| 2005/0102509 A1 * | 5/2005 | Fascenda | 713/165 |
| 2006/0174104 A1 * | 8/2006 | Crichton et al. | 713/155 |

OTHER PUBLICATIONS

U.S. Appl. No. 11/671,264 filed in the name of D.V. Bailey et al. on Feb. 5, 2007 and entitled "Wireless Authentication Methods and Apparatus".

(Continued)

*Primary Examiner* — Brandon Hoffman
*Assistant Examiner* — Michael D Anderson
(74) *Attorney, Agent, or Firm* — Ryan, Mason & Lewis, LLP

(57) ABSTRACT

Techniques are disclosed for performing operations in an authentication token or other cryptographic device in a system comprising an authentication server. In one aspect, a code generated by the authentication server is received in the cryptographic device. The code may have associated therewith information specifying at least one operation to be performed by the cryptographic device. The cryptographic device authenticates the code, and responsive to authentication of the code, performs the specified operation. If the code is not authenticated, the operation is not performed. The code may be determined as a function of a one-time password generated by the authentication server. The function may also take as an input an identifier of the operation to be performed.

22 Claims, 2 Drawing Sheets

(56) References Cited

OTHER PUBLICATIONS

U.S. Appl. No. 11/530,655 filed in the name of D.V. Bailey et al. on Sep. 11, 2006 and entitled "Tokencode Exchanges for Peripheral Authentication".

U.S. Appl. No. 11/394,536 filed in the name of Y. Atzmony et al. on Mar. 31, 2006 and entitled "Accessing Data Storage Devices."

U.S. Appl. No. 11/731,181 filed in the name of David J. Allen on Mar. 30, 2007 and entitled "Protection of Point-in-Time Application Data."

* cited by examiner

FIG. 3

```
SERVER                                          TOKEN
Initial State:                                  Initial State:
Time (t_S)                                      Time (t_T)
Shared Secret (k)                               Shared Secret (k)
Request Function (r)                            Other Info (i)
Offset (o)
Other Info (i)

OPERATION:
1)  o = future time offset
2)  i = other information
3)  OTP_S = F_1 ((t_S + o),k,i)
4)  Code_S = F_2 (OTP_S,r)
5)    r, Code_S ---------------------------→ r, Code_S
6)                                              i = other information
                                                Result=Fail
7)                                              FOR n=(0 to max)
                                                    t=(t_T+n)
                                                    OTP_T=F_1 (t,k,i)
                                                    Code_T=F_2 (OTP_T,r)
8)                                                  IF (Code_S=Code_T)
                                                        THEN perform r
                                                        AND Result=Success
                                                        BREAK
                                                    ENDIF
                                                NEXT n
Optional Steps:
9)                                              Code_R=F_3 (OTP_T,Result)
Code_R ←--------------------------------------- Code_R
IF Code_R = F_3 (OTP_S, Success) THEN operation succeeded
IF Code_R = F_3 (OTP_S, Fail) THEN operation failed
```

US 9,071,439 B2

METHOD AND APPARATUS FOR REMOTE ADMINISTRATION OF CRYPTOGRAPHIC DEVICES

RELATED APPLICATIONS(S)

The present application claims the priority of U.S. Provisional Patent Application Ser. No. 60/914,199, filed Apr. 26, 2007 and entitled "Method and Apparatus for Remote Administration of Cryptographic Devices," the disclosure of which is incorporated by reference herein.

The present application is also related to U.S. patent application Ser. No. 11/530,655, filed Sep. 11, 2006 and entitled "Tokencode Exchanges for Peripheral Authentication," which is commonly assigned herewith and incorporated by reference herein.

FIELD OF THE INVENTION

The present invention relates generally to cryptographic techniques for authentication over a network or in other types of communication systems.

BACKGROUND OF THE INVENTION

Cryptographic devices include, by way of example, user authentication tokens. Authentication tokens are typically implemented as small, hand-held devices that display a series of passwords over time. These passwords, which may be one-time passwords, are more generally referred to herein as tokencodes. A user equipped with such an authentication token reads the currently displayed password and enters it into a computer or other element of an authentication system as part of an authentication operation. This type of dynamic password arrangement offers a significant security improvement over authentication based on a static password.

Conventional authentication tokens include both time-based tokens and event-based tokens. The latter are also referred to herein as event-triggered tokens. In a typical time-based token, the displayed passwords are based on a secret value and the time of day. A verifier with access to the secret value and a time of day clock can verify that a given presented password is valid. Event-based tokens generate passwords in response to a designated event, such as a user pressing a button on the token. Each time the button is pressed, a new password is generated based on a secret value and an event counter. A verifier with access to the secret value and the current event count can verify that a given presented password is valid.

Passwords can be communicated directly from the authentication token to a computer or other element of an authentication system, instead of being displayed to the user. For example, a wired connection such as a universal serial bus (USB) interface may be used for this purpose. Wireless authentication tokens are also known. In such tokens, the passwords are wirelessly communicated to a computer or other element of an authentication system. These wired or wireless arrangements, also referred to herein as connected tokens, save the user the trouble of reading the password from the display and manually entering it into the computer.

Additional details of exemplary conventional authentication tokens can be found in, for example, U.S. Pat. No. 4,720,860, entitled "Method and Apparatus for Positively Identifying an Individual," U.S. Pat. No. 5,168,520, entitled "Method and Apparatus for Personal Identification," and U.S. Pat. No. 5,361,062, entitled "Personal Security System," all of which are incorporated by reference herein.

Prior to accepting a password generated by an authentication token, a computer may require the user to enter a personal identification number (PIN) or other static access code. This provides an additional security factor, based on something the user knows, thereby protecting against unauthorized use of a token that is lost or stolen.

It is not uncommon, however, for a user to forget his or her PIN, and thereby be unable to use the token. Also, if an incorrect value for this PIN is entered too many consecutive times, the token will typically lock itself In such situations, a user may be required to physically transport the token to a security administrator to reset the PIN or unlock the token. Alternatively, a user may be provided with a PIN unlocking key (PUK) that allows the user to reset the PIN or unlock the token.

Both of these conventional approaches suffer from drawbacks. The first approach can take considerable time, and is burdensome for administrators. This would be a particularly cumbersome approach if the user is remote from the administrator, and if the token provided additional functions such as acting as an employee badge.

In the second approach, allowing user access to the PUK provides a "back-door" to the token that may be undesirable, particularly if the PUK can also be used for other administrative tasks on the token, or is the same for multiple tokens. A PUK may be viewed as an administrator PIN for the token, and the idea of allowing a user to know an administrator PIN is generally undesirable. Once an administrator has released the PUK to the user, the administrator cannot be sure that the user has not further distributed the PUK, nor left a copy of the PUK unprotected. This degrades the overall security of the approach.

The conventional approaches described above are similarly problematic with regard to performance of other administrative operations on authentication tokens, such as configuration changes or provisioning of new information other than updated PINs.

Although security may be enhanced to some extent through encryption of commands sent to the token, such encryption is suitable only for connected tokens, and in any case fails to overcome the fundamental deficiencies noted above.

Accordingly, what is needed is an improved approach to remote administration of authentication tokens and other cryptographic devices, which avoids the problems of the conventional approaches.

SUMMARY OF THE INVENTION

The present invention in one or more of the illustrative embodiments described herein meets the above-identified need by providing techniques which allow an authentication server to remotely configure or otherwise have requested operations performed by a given authentication token or other cryptographic device.

In accordance with one aspect of the invention, an authentication server requests performance of an operation by a cryptographic device. A code generated by the authentication server is received in the cryptographic device. The code may have associated therewith information specifying at least one operation to be performed by the cryptographic device. The cryptographic device authenticates the code, and responsive to authentication of the code, performs the specified operation. If the code is not authenticated, the operation is not performed. The code may be determined as a function of a one-time password generated by the authentication server. The function may also take as an input an identifier of the operation to be performed.

Examples of operations that may be performed by the cryptographic device under the control of the authentication server include updating an access code of the cryptographic device, unlocking the cryptographic device, resetting a time value or event counter value on the cryptographic device, altering a configurable parameter of the cryptographic device, updating a shared secret in the cryptographic device, or granting administrative access to the cryptographic device or a host that incorporates the cryptographic device.

In one illustrative embodiment, the authentication server generates the code based on computation of a one-time password OTPs for a future time specified by an offset o relative to a current time $t_S$:

$$OTP_S = F_1((t_S+o), k),$$

where $F_1$ denotes a cryptographic function, such as, for example, a one-way cryptographic hash function, and k denotes a secret shared by the server and the cryptographic device. The code in this embodiment comprises a code $Code_S$ generated by the authentication server based on the one-time password $OTP_S$:

$$Code_S = F_2(OTP_S, r),$$

where $F_2$ denotes a cryptographic function, and r denotes an identifier of the operation. The identifier r of the specified operation may be sent by the authentication server with the code Codes to the cryptographic device, or otherwise made apparent to the cryptographic device. For each of a plurality of time intervals t within a designated range, the cryptographic device computes $$OTP_T = F_1(t, k) \text{ and } Code_T = F_2(OTP_T, r),$$

and if $Code_S = Code_T$ for any one of the intervals in the range, then the code has been authenticated and the operation r is performed.

The illustrative embodiments advantageously overcome the drawbacks of conventional techniques for administration of authentication tokens and other types of cryptographic devices. For example, the illustrative embodiments advantageously allow management operations or other types of administrative operations to be performed on an authentication token under the control of a remote authentication server, without releasing a PUK or other sensitive information to a user, or requiring physical transport of the token to an administrator.

These and other features and advantages of the present invention will become more readily apparent from the accompanying drawings and the following detailed description.

BRIEF DESCRIPTION OF THE DRAWINGS

FIG. 3 is a protocol flow diagram illustrating communications between an authentication token and an authentication server in an illustrative embodiment of the invention.

DETAILED DESCRIPTION

The present invention will be described herein with reference to exemplary cryptographic devices and an associated authentication system. It is to be appreciated, however, that the invention is not restricted to use with the particular illustrative device and system configurations shown.

The term "code" as used herein is intended to include authentication information such as one-time passwords or other tokencodes, or more generally any other information that may be utilized for authentication purposes. Although the illustrative embodiments will be described below in the context of one-time passwords (OTPs), it is to be appreciated that the invention is more broadly applicable to any other type of code.

The term "cryptographic device" as used herein is intended to be construed broadly, so as encompass not only authentication tokens but also other types of devices that can be remotely administered by an authentication server that also authenticates codes from such devices. Similarly, the term "authentication server" should be understood to encompass any type of processing device or set of such devices that is operative to authenticate an authentication token or other type of cryptographic device. It need not be a network-based server, and may be implemented as a portion of a device that performs other functions, as a combination of multiple servers or other devices, or in other forms.

As will be described, the present invention in one or more illustrative embodiments provides techniques for remote administration of an authentication token or other cryptographic device by an authentication server that is also used to authenticate codes generated by that device.

Figure 1:
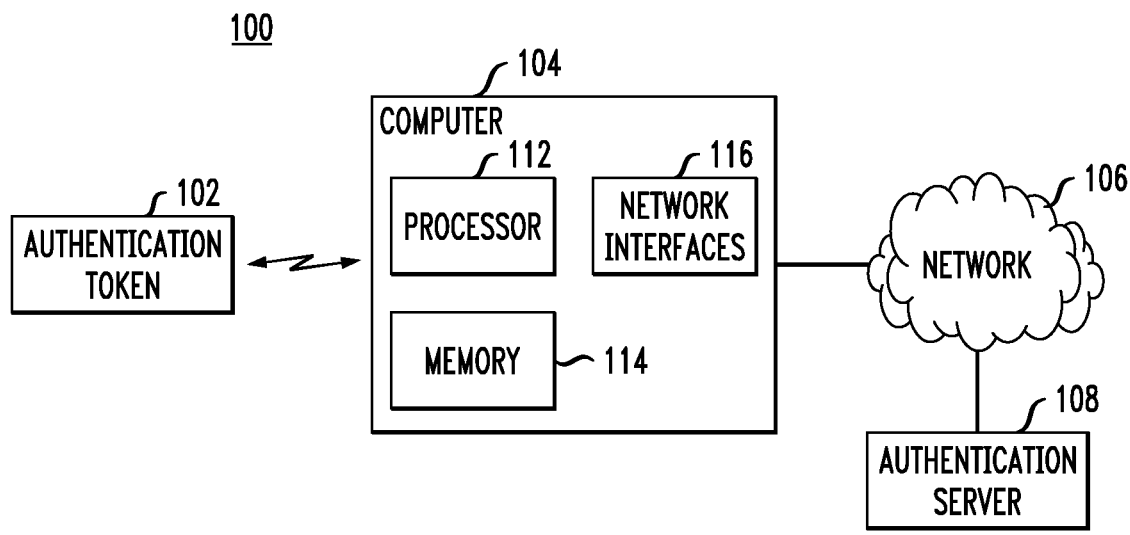
FIG. 1 is simplified block diagram showing one example of an authentication system in an illustrative embodiment of the invention.

FIG. 1 shows an example of a network-based communication system 100 which includes an authentication token 102, a host device 104, a network 106 and an authentication server 108. The authentication token is configured to generate OTPs or other tokencodes in a conventional manner. Such passwords may be presented to a user via a display of the token, such that the user can manually enter a given password into a user interface of the host device 104. Alternatively, a given password may be communicated directly from the authentication token via a wired or wireless connection between that device and the host device. By way of example, the authentication token may be configured to communicate with the host device 104 via a wired connection such as a USB interface, or via a wireless connection such as a Bluetooth or IEEE 802.11 connection.

The authentication token 102 may be, for example, a time-based authentication token, an event-based authentication token, a challenge-response token, a hash-chain token, or a hybrid token that incorporates multiple such capabilities, such as a hybrid time-based and event-based token. A given authentication token may be a connected token or a disconnected token, or one capable of operating in both connected and disconnected modes. The disclosed techniques can be adapted in a straightforward manner for use with other types of authentication devices, or more generally cryptographic devices.

The host device 104 may comprise a desktop or portable personal computer, mobile telephone, personal digital assistant (PDA), wireless email device, workstation, kiosk, television set-top box, game console, or any other information processing device that supports authentication via passwords generated by an authentication token.

It should also be noted that a given authentication device need not take the form of a stand-alone hand-held token. For example, such a device may be incorporated into another processing device, such as a computer, mobile telephone, etc. In one such implementation, the host device and the authentication token may be combined into a single processing device that communicates with the authentication server.

The network 106 may comprise, for example, a global computer network such as the Internet, a wide area network (WAN), a local area network (LAN), a satellite network, a telephone or cable network, or various portions or combinations of these and other types of networks.

In the system 100, the authentication server 108 is configured as a back-end authentication server, in that it communicates with host device over a network, but other types of authentication servers may be used.

A wide variety of conventional authentication processes may be implemented using an authentication token, host device and authentication server arranged as shown in FIG. 1. Such processes, being well known to those skilled in the art, will not be described in further detail herein. The present invention does not require the use of any particular type of authentication process to authenticate the token to the server.

It is to be appreciated that a given embodiment of the system 100 may include multiple instances of authentication token 102, host device 104, authentication server 108, and possibly other system components, although only single instances of such components are shown in the simplified system diagram for clarity of illustration. Also, as indicated previously, other embodiments may combine certain system elements, such as the authentication token and the host device. It is also possible to eliminate, modify or replace other system elements. For example, authentication token 102 may communicate directly with authentication server 108, rather than via other elements such as host device 104 and network 106.

Figure 2:
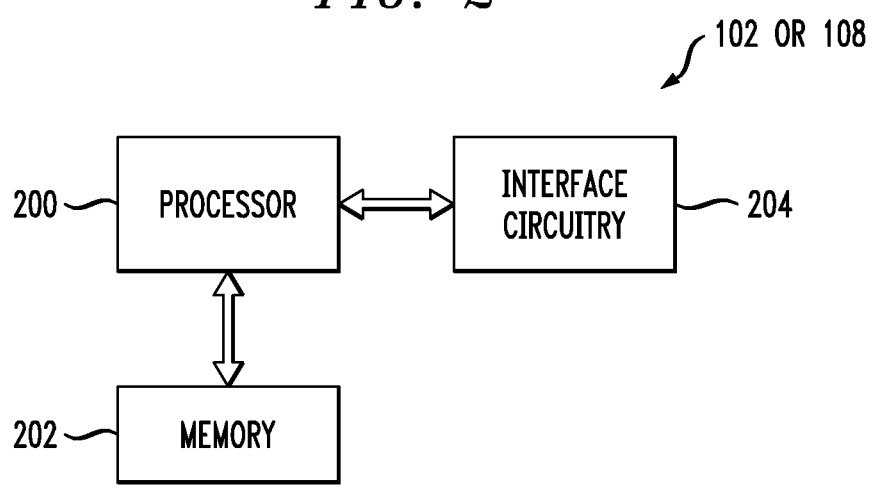
FIG. 2 shows a more detailed view of one possible implementation of a processing device of the FIG. 1 system.

Referring now to FIG. 2, a more detailed illustrative implementation of a given processing device of the system 100 is shown. The processing device as shown generally in FIG. 2 may be viewed as representative of the authentication token 102 or the authentication server 108. In this embodiment, the processing device comprises a processor 200 coupled to a memory 202. Thus, at least a portion of a given remote administration process as disclosed herein may be implemented in the form of software that is executed on a processing device comprising a processor coupled to a memory. Processor 200 is also coupled to interface circuitry 204.

If the processing device of FIG. 2 is viewed as representative of authentication token 102, the interface circuitry 204 may comprise, for example, circuitry for interfacing the authentication token 102 to the host device 104 via a wired or wireless connection in the case of a connected token, or circuitry for generating a visual or audible presentation of a given generated password in the case of a disconnected token. Thus, the interface circuitry may include, for example, wired or wireless interface circuitry such as USB, Bluetooth or 802.11 circuitry, or one or more speakers, displays and associated drivers, in any combination.

If the processing device of FIG. 2 is viewed as representative of authentication server 108, the interface circuitry 204 may comprise a network interface card or other type of network interface circuitry configured to permit the authentication server to communicate over the network 106. In other embodiments, such interface circuitry may be configured to allow the authentication server to communicate directly with the host device 104, or directly with the authentication token 102.

The various elements 200, 202 and 204 of FIG. 2 may be implemented in whole or in part as a conventional microprocessor, microcontroller, digital signal processor, application-specific integrated circuit (ASIC) or other type of circuitry, as well as portions or combinations of such circuitry elements. As indicated previously, portions of a remote administration process in accordance with a given illustrative embodiment of the invention can be implemented at least in part in the form of one or more software programs that are stored at least in part in the memory 202 and executed by processor 200. Memory 202 may also be used for storing information used to perform password generation or other operations associated with a remote administration process.

Techniques for remote administration of the authentication token 102 by the authentication server 108 in system 100 will now be described in greater detail. Generally, in such a technique, the authentication token receives a code from the authentication server in the cryptographic device. The code may have associated therewith information specifying at least one operation to be performed by the authentication token. Alternatively, the operation may be implicit in the code, for example, in an arrangement in which only one operation is permitted to be performed upon the request of an authentication server. If the authentication token is able to verify or otherwise authenticate the code supplied by the authentication server, the authentication token performs the specified operation. It should be noted that this is a reversal of the typical roles of authentication token and authentication server, in that the server typically authenticates codes supplied by the authentication token. In the illustrative embodiments, particular operations are performed by the authentication token based on codes provided thereto by the authentication server, thereby in effect permitting remote administration of the token by the server.

It should be noted that techniques for allowing an authentication token to authenticate a code received from an authentication server are disclosed in the above-cited U.S. patent application Ser. No. 11/530,655. One or more of these techniques may be utilized in a given embodiment of the present invention.

The code provided by the authentication server 108 may comprise an OTP generated from a seed or other secret that is shared with the authentication token 102. Thus, the shared seed or other shared secret may be stored in both the authentication server and the authentication token, and utilized by both to generate codes in the form of OTPs. A given OTP generated by the authentication server has information associated therewith that specifies an operation to be performed by the authentication token. If the authentication token is able to verify or otherwise authenticate the OTP provided by the authentication server, it performs the specified action. Otherwise, it does not perform the specified action. The information associated with the OTP generated by the authentication server may be encoded using the OTP, and may comprise information specifying a set of operations to be performed by the authentication token, management data or other types of information utilized to provide remote administration of the token.

A given code communicated from the authentication server 108 to the authentication token 102 may be viewed as a request to perform the operation specified by the associated information. The disclosed techniques can be applied to any request that can be generated at the authentication server, and which needs to be validated at the token before the request is acted upon by the token. Examples of requests that may be generated by an authentication server include the following:

1. Token PIN update. As mentioned previously, an authentication token may be configured to require entry of a PIN to access the token. Updating the token PIN may involve resetting the PIN to a new value if the user has forgotten the previous PIN.

2. Unlock of a locked token. This involves unlocking a token that has locked itself due to repeated entry of incorrect PINs.

3. Time or event synchronization. This involves resetting the time on a time-based token or an event counter on an event-based token, in order to ensure that both the token and the authentication server are synchronized with respect to time or events.

4. Token configuration update. This involves resetting the configuration of the token, such as, for example, the number of digits displayed by the token, its allowed modes of operation, selection of cryptographic algorithms, token lifetime, available applications on the token, provisioning of new applications on the token, and cryptographic operation authorizations.

5. Token shared secret update. This involves resetting the stored shared secret in the token. Note that some tokens may contain a single shared secret, while other tokens may contain multiple shared secrets. The same basic process can be used to update one or many of these shared secrets.

6. General administrative access to the token. The presentation of a correct code may grant the entity presenting the code general administrative access, potentially limited in time or functionality, to the token or a host device that incorporates the token.

It is to be appreciated that the foregoing are merely examples, and numerous other types of requests can be accommodated in a given embodiment of the invention.

An illustrative embodiment will now be described in which the authentication token 102 is assumed to be a time-based token, and both the token and the authentication server 108 are assumed to have a synchronized clock. The server generates a future OTP which is sent along with the request to the token. This OTP corresponds to an OTP that will be generated in the near future by the token using its time-based algorithm. The token waits an appropriate amount of time until the corresponding OTP is generated locally. Since the authentication server should have the only other copy of the shared secret, the fact that the token received a properly constructed request with a future OTP is a signal to the token that this is a valid request generated by that server.

If the request was passed over a secure channel between the authentication server and the token, then the OTP could be passed in the clear over that secure channel.

In many practical cases, there will not be a secure channel between the server and the token. For such cases, the OTP generated by the server may be modified by a function F, where the result of F(OTP) is actually sent to the token together with the request. Internally, the token will independently generate the potential OTPs, and apply the function F to these OTPs. If the result of the internal computation matches the received output of the F(OTP) generated at the server, then the token will accept this as proof that the supplied request is valid. Note that a number of potential cryptographic techniques can be used as the function F, including one-way cryptographic hash functions. Those skilled in the art are familiar with the operation of such cryptographic techniques. Additional details regarding conventional cryptographic techniques may be found in, e.g., A. J. Menezes et al., Handbook of Applied Cryptography, CRC Press, 1997, which is incorporated by reference herein. Additional conventional aspects of OTPs are described in, for example, M. Jakobsson and S. Myers, "Phishing and Countermeasures," pp. 301-308, Wiley & Sons, 2006.

In some cases it may be preferable that the server actually include the information about the request as well as the OTP as part of the data which is operated upon by the function F. For example, the server may send F(OTP, request). In this way, the token can be assured that the request is bound to the OTP.

It may also be helpful in certain situations to pass additional information related to the OTP calculation from the server to the token. For example, the server could inform a time-based token of the specific time value used to compute the OTP. Similarly, the server could inform an event-based token of the specific counter value used to compute the OTP. One advantage of passing such time or event values is to reduce the need for the token to search windows of OTPs looking for the correct time or counter value.

Security may be further improved by having the OTPs used in remote administration of a token by the server be substantially longer than the OTPs used in typical token-to-server authentication scenarios. Alternatively, rather than sending an OTP of a function of the OTP, the server may send a function of additional information such as the shared secret, the time, the request, etc. For example, instead of computing F(OTP, request), the server could compute F(shared_secret, time, request). Another way to further improve security would be to require multiple consecutive OTP codes in order to increase the assurance that the supplied OTP is not an accidental collision.

Another illustrative embodiment will now be described in which the authentication token 102 is assumed to be an event-based token, such that the token and the authentication server 108 do not have a synchronized clock but instead maintain some other form of state, such as an event counter value. In this embodiment, upon receiving a request from the server, the token would verify that the server-provided counter value, $c\_s$, is acceptable, given its own copy, before verifying the authenticated request and executing the request. As one example, the server could authenticate requests by computing F(shared secret, $c\_s$, requested operation). In this example, the token would store a counter value $c\_t$, and if $g(c\_t, c\_s)$ is acceptable for some function g (e.g., $g(a, b)=a<b$), replace $c\_t$ with $c\_s$ as the locally stored counter value. This will protect the token against replays of earlier messages while still not requiring it to store and send out a challenge before accepting a server message.

It is also possible that the OTP algorithm used by a token for computing authentication codes may be different than the algorithm used by the same token for validating management operations. For example, a time-based token could generate time-based OTP codes to be used for normal authentications, but the token could also maintain a counter which is incremented for each management operation. The server would maintain a similar counter to be used when generating management OTP codes to be validated by the token. In this way, the space of OTP authentication codes will be different than the space of OTP management codes, and therefore there would be no risk of a management OTP code being used for authentication.

In yet another embodiment, the same basic OTP algorithm can be used for generating both the authentication and management OTP codes, but a slight modification of the OTP algorithm could occur to distinguish authentication OTP codes from management OTP codes. Examples of these modifications could include the use of different padding for authentication and management OTPs, or transformation of the shared secret.

The token may utilize its basic OTP algorithm to generate a response code that is returned from the token to the server. This response code could contain an indication of the status of the requested management operation (e.g., success or failure) and/or additional information.

A given embodiment of the invention may be configured to allow temporary administration of a resource with defined privileges. In such an embodiment, the resource may contain an embedded token which may be used to validate credentials computed using an OTP. The validity of the credentials may be constrained in time (for time-based OTP algorithms) or in number of usages (for event-based OTP algorithms) or any combination thereof. For added security, the credentials may also be tied to an individual presenting them to the protected resource, e.g., by also including a static PIN or other static password in the credential computation. The administrator of the protected resource must then also provide the static password before being granted access to the resource.

FIG. 3 shows an example of a protocol flow carried out between authentication token 102 and authentication server 108 in an illustrative embodiment of the invention. Other embodiments may use alternative protocol flows, as will be readily appreciated. The figure shows the respective initial states of the server and token, as well as Steps 1 through 9 of the protocol flow.

In Step 1, the server chooses a future time offset o within an acceptable range.

In Step 2, optional information i is determined. Examples could include a PIN or any other type of information associated with the particular operation to be performed.

In Step 3, the server computes an OTP for the future time given by offset o, as follows:

$$OTP_S = F_1((t_S+o), k, i),$$

where $t_s$ denotes the current time at the server and k denotes the secret shared by the server and token.

In Step 4, the server computes a management operation code based on the OTPs value determined in Step 3, as follows:

$$Code_S = F_2(OTP_S, r),$$

where r denotes the particular management operation to be performed by the token at the request of the server.

In Step 5, the server sends r and Codes to the token. The token holds Codes pending validation.

In Step 6, the optional information i is provided to the token, for example, via an out-of-band mechanism.

In Step 7, for each time interval t within an acceptable range bounded by a maximum value of an index n, the token computes $$OTP_T = F_1(t, k, i) \text{ and } Code_T = F_2(OTP_T, r).$$

In Step 8, if $Code_S = Code_T$ at some point in the acceptable range, then the requested management operation r is performed. In other embodiments, there may be one or more other specified conditions to be fulfilled before the requested operation is performed. Thus, the token need not blindly perform the requested operation if $Code_S = Code_T$. These and other alternative arrangements involving one or more additional conditions are intended to be encompassed by the recitations herein relating to performance of at least one operation responsive to authentication of a code.

In Step 9, an optional response code is computed by the token as follows:

$$Code_R = F_3(OTP_T, \text{Result}).$$

The response code is then passed back to the server to signal the success or failure of the operation.

Although Step 9 is referred to as optional in this particular example, that should not be construed as a representation that any of the other steps are requirements of the invention. In alternative embodiments, these other steps of the FIG. 3 protocol may be modified or eliminated, or alternative steps may be added.

It should be noted that the three functions $F_1$, $F_2$ and $F_3$ in the above protocol flow example may be the same or different functions. For example, each may be the same cryptographic function F as described above, or different versions of F. Additionally, the value r representing the management operation is needed by the token in order to compute $Code_T$. As indicated in the figure, the value r could be supplied to the token in-band together with $Code_S$. It could also be supplied out-of-band, or could be determined by iterating on possible values for r when computing $Code_T$.

In the FIG. 3 embodiment, the requested operation r is embedded in the computation of the function F. This has the effect of constraining the use of the OTP to the specific requested operation. If an attacker attempted to use the OTP with a management operation other than the management operation which was used to compute the function F, then the token would reject the OTP and the operation would not be performed.

It may be desirable to quantify the security properties of function F. For example, if F is computed using time as part of the input, one may determine how long will it take an attacker to brute force F and extract the OTP. This must be completed before the time of the OTP elapses. If F is computed using a challenge-response OTP, there is no such window. In either case, truncating the output of F may help. In addition to using a truncated F, one may limit the number of times per minute that codes can be supplied, in order to limit the risk that an attacker will obtain an OTP which can be utilized to impersonate the user. With challenge-response one may limit the rate of attempts during an attack. One way to accomplish this is to throttle the attempt rate when there are consecutive failures. Probabilities of success for the various attack methods may be computed. For connected tokens, security may be improved by increasing the length of response strings. Alternatively or additionally, one may use a full seed value to encrypt a given operation request.

The illustrative embodiments advantageously allow management operations or other types of administrative operations to be performed on an authentication token under the control of a remote authentication server, without releasing a PUK or other sensitive information to a user, or requiring physical transport of the token to an administrator. The server is authenticated to the token using an OTP which is generated by the server and validated in the token. If the OTP is properly validated at the token, and any other specified conditions are met, then the token will allow the requested operation to occur. Once this OTP has been used, it will not be accepted by the token again. In this way, replay attacks are avoided.

It should again be emphasized that the above-described embodiments of the invention are presented for purposes of illustration. Many variations and other alternative embodiments may be used. For example, although described primarily in the context of time-based and event-based authentication tokens, the techniques are applicable to a wide variety of other types of cryptographic devices that can benefit from remote administration. Also, the particular configuration of system and device elements shown in FIGS. 1 and 2, and their interactions as shown in FIG. 3, may be varied in other embodiments. For example, the types of codes and associated computations used to control performance of a desired operation on a cryptographic device can be varied in alternative embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method of performing at least one operation in a cryptographic device in a system comprising an authentication server, the method comprising receiving in the cryptographic device a code generated by the authentication server; authenticating the code in the cryptographic device; and responsive to authentication of the code, performing said at least one operation in the cryptographic device; wherein the code is received in the cryptographic device in association with a request by the authentication server for the cryptographic device to perform said at least one operation; and wherein the operation to be performed by the cryptographic device comprises resetting a time value or event counter value on the cryptographic device.

2. The method of claim 1 wherein the code has associated therewith information specifying said at least one operation to be performed by the cryptographic device.

3. The method of claim 1 wherein the cryptographic device comprises an authentication token.

4. A method of performing at least one operation in a cryptographic device in a system comprising an authentication server, the method comprising: receiving in the cryptographic device a code generated by the authentication server; authenticating the code in the cryptographic device; and responsive to authentication of the code, performing said at least one operation in the cryptographic device; wherein the code is received in the cryptographic device in association with a request by the authentication server for the cryptographic device to perform said at least one operation;
and wherein the code is determined as a function of at least an identifier of the operation.

5. A method of performing at least one operation in a cryptographic device in a system comprising an authentication server, the method comprising: receiving in the cryptographic device a code generated by the authentication server; authenticating the code in the cryptographic device; and responsive to authentication of the code, performing said at least one operation in the cryptographic device; wherein the code is received in the cryptographic device in association with a request by the authentication server for the cryptographic device to perform said at least one operation; and wherein the code is determined as a function of at least a one-time password generated by the authentication server.

6. The method of claim 5 wherein the one-time password corresponds to a password to be generated by the cryptographic device.

7. The method of claim 6 wherein the password to be generated by the cryptographic device comprises a password to be generated at a designated offset from a current state of the cryptographic device.

8. The method of claim 1 further including providing to the authentication server from the cryptographic device an additional code indicative of success or failure of the operation.

9. The method of claim 1 wherein the operation to be performed by the cryptographic device comprises updating an access code of the cryptographic device.

10. The method of claim 1 wherein the operation to be performed by the cryptographic device comprises unlocking the cryptographic device.

11. The method of claim 1 wherein the operation to be performed by the cryptographic device comprises altering a configurable parameter of the cryptographic device.

12. The method of claim 1 wherein the operation to be performed by the cryptographic device comprises updating a shared secret in the cryptographic device.

13. The method of claim 1 wherein the operation to be performed by the cryptographic device comprises granting administrative access to the cryptographic device or a host associated with the cryptographic device.

14. A method of controlling the performance of at least one operation in a cryptographic device in a system comprising an authentication server, the method comprising: generating a code in the authentication server; and providing the generated code to the cryptographic device;

wherein the code is authenticated in the cryptographic device, and responsive to authentication of the code, the cryptographic device performs said at least one operation; wherein the code is provided to the cryptographic device in association with a request by the authentication server for the cryptographic device to perform said at least one operation; and wherein the authentication server generates the code based at least in part on computation of a one-time password $OTP_s$ for a future time specified by an offset o relative to a current time $t_s$:

$$OTP_S = F_1((t_S+o), k),$$

where $F_1$ denotes a cryptographic function, and k denotes a secret shared by the server and the cryptographic device.

15. The method of claim 14 wherein the code comprises a code $Code_s$ generated by the authentication server based on the one-time password $OTP_s$:

$$Code_S = F_2(OTP_S, r),$$

where $F_2$ denotes a cryptographic function, and r denotes an identifier of the operation.

16. The method of claim 15 wherein the identifier r of the specified operation is sent by the authentication server with the code $Code_s$ to the cryptographic device.

17. The method of claim 15 wherein for each of a plurality of time intervals t within a designated range, the cryptographic device computes $$OTP_T = F_1(t, k) \text{ and } Code_T = F_2(OTP_T, r),$$

and if $Code_s = Code_T$ for any one of the intervals in the range, then the operation r is performed.

18. A non-transitory processor-readable storage medium storing one or more software programs, wherein the one or more software programs when executed by a processor of a cryptographic device implement: receiving in the cryptographic device a code generated by an authentication server; authenticating the code in the cryptographic device; and responsive to authentication of the code, performing said at least one operation in the cryptographic device; wherein the code is received in the cryptographic device in association with a request by the authentication server for the cryptographic device to perform said at least one operation; and wherein the operation to be performed by the cryptographic device comprises resetting a time value or event counter value on the cryptographic device.

19. An apparatus comprising:
a cryptographic device having a processor coupled to a memory;
wherein the cryptographic device is configured to receive a code generated by an authentication server; wherein the cryptographic device is further configured to authenticate the code generated by the authentication server, and responsive to authentication of the code, to perform at least one operation; wherein the code is received in the cryptographic device in association with a request by the authentication server for the cryptographic device to perform said at least one operation; and wherein the operation to be performed by the cryptographic device comprises resetting a time value or event counter value on the cryptographic device.

20. The apparatus of claim 19 wherein the cryptographic device comprises an authentication token.

21. A method of controlling the performance of at least one operation in a cryptographic device in a system comprising an authentication server, the method comprising generating a code in the authentication server; and providing the generated code to the cryptographic device; wherein the code is authenticated in the cryptographic device, and responsive to authentication of the code, the cryptographic device performs said at least one operation; wherein the code is provided to the cryptographic device in association with a request by the authentication server for the cryptographic device to perform said at least one operation; and wherein the code is determined as a function of at least one of: an identifier of the operation; and a one-time password generated by the authentication server.

22. A system comprising: a plurality of cryptographic devices; and an authentication server; wherein the authentication server is configured to generate a code; wherein a given one of the cryptographic devices is configured to authenticate the code generated by the authentication server, and responsive to authentication of the code, to perform at least one operation; wherein the code is received in the given one of the cryptographic devices in association with a request by the authentication server for the given one of the cryptographic devices to perform said at least one operation; and wherein the code is determined as a function of at least one of: an identifier of the operation; and a one-time password generated by the authentication server.

* * * * *